March 24, 1925.
F. L. SESSIONS
DRY POWDER DUSTER
Filed March 4, 1922
1,530,578
2 Sheets-Sheet 1
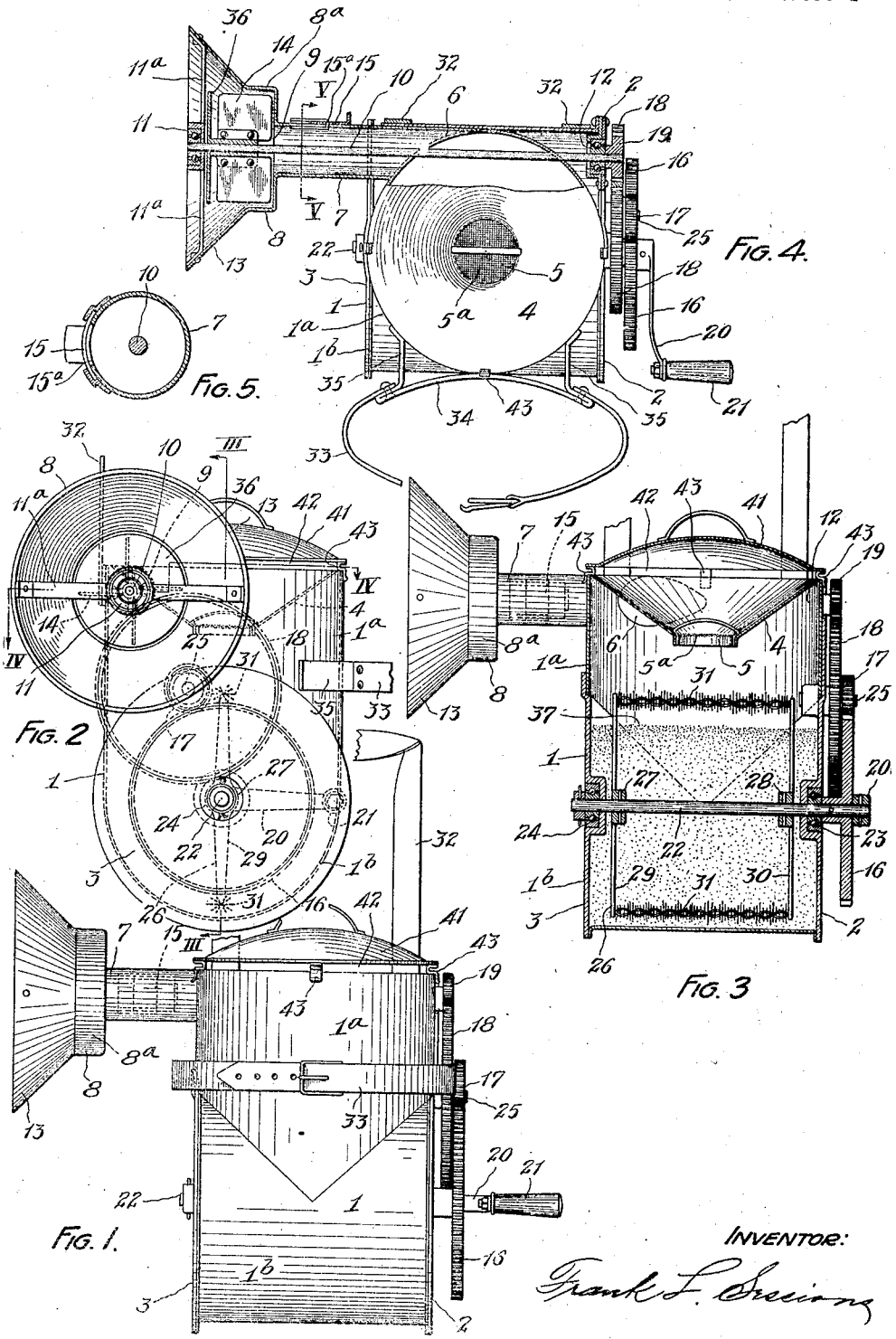
INVENTOR:
Frank L. Sessions March 24, 1925.

F. L. SESSIONS 1,530,578

DRY POWDER DUSTER

Filed March 4, 1922

INVENTOR:
Frank L. Sessions

Patented Mar. 24, 1925.

1,530,578

UNITED STATES PATENT OFFICE.

FRANK L. SESSIONS, OF LAKEWOOD, OHIO.

DRY-POWDER DUSTER.

Application filed March 4, 1922. Serial No. 541,157.

*To all whom it may concern:*

Be it known that I, FRANK L. SESSIONS, a citizen of the United States, residing at Lakewood, in the county of Cuyahoga and State of Ohio, have invented certain new and useful Improvements in Dry-Powder Dusters, of which the following is a specification.

My invention relates to apparatus for dusting plants, shrubs, vines, trees or other vegetation with dry insecticide powder and is particularly adapted to the dusting of cotton plants with arsenate of calcium. My invention may also be used for the sowing of grass or other seed broadcast.

The principal objects of my invention are: the provision of a new and useful apparatus for mixing finely divided materials such as insecticide powder with air and discharging the mixture from the apparatus in a cloud upon or in the vicinity of the plants to be dusted; the provision of a dry powder duster in which the powder is carried in a magazine or hopper and in which the air, which is to convey the powder into the atmosphere, is caused to pass through the magazine or hopper over the powder which it contains and to pick up and carry with it powder from the magazine to the suction and distributing fan; the provision of means for agitating the powder in the magazine so that the air passing through may readily carry off the particles thrown into the air above the body of powder in the magazine; the provision of means whereby the dust-density of the air which passes to the distributing fan may be varied and controlled; the provision of a dry powder duster in which the air which is caused to mingle with the dust in the magazine is sucked through the magazine so that there is no tendency for the dust to be blown back into the face of the operator but all of it is carried out through the distributing fan and is discharged away from the operator; and the provision of a new and improved suction and distributing fan. These and other objects of my invention are attained by the use of the apparatus herein described and shown in the accompanying drawings in which—

Fig. 1 is a rear elevation of a machine embodying my invention;

Fig. 2 is an elevation looking into the discharge end of the fan;

Fig. 3 is a vertical section on line III—III of Fig. 2;

Fig. 4 is a plan view partly in section on line IV—IV of Fig. 2;

Fig. 5 is a section on line V—V of Fig. 4;

Figure 6:
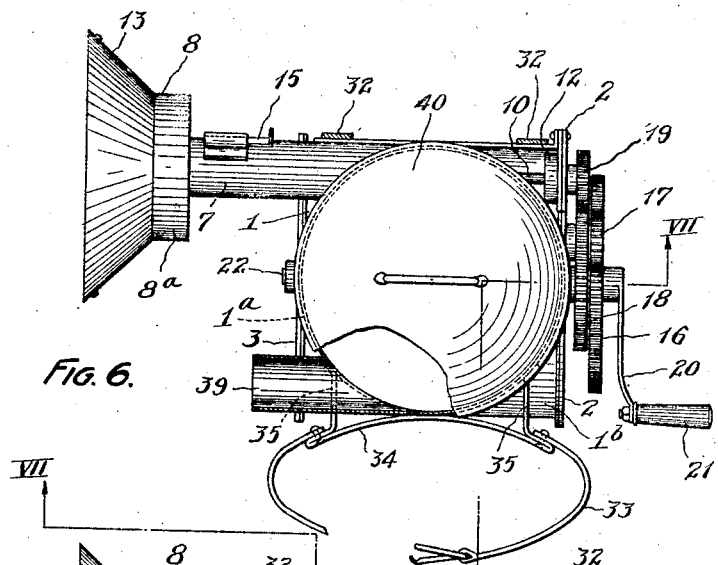
Fig. 6 is a plan view of a machine having a modified form of cover and an air intake opening in the wall of the receptacle.

Referring to the drawings, 1 represents a receptacle adapted to contain a supply of the powder to be dusted or other material to be sown broadcast. While it is possible to make this receptacle 1, in a variety of ways I prefer that it be of the shape shown in the drawings in which the upper portion, $1^a$, is a cylindrical shell with its axis vertical and the lower portion, $1^b$, is a cylindrical shell with its axis horizontal. The ends of the lower portion, $1^b$, are closed preferably by plates such as are shown at 2 and 3. Plates 2 and 3, may be made of heavier metal than is used for the cylindrical portions of the receptacle in order to stiffen the structure and provide suitable supports for the bearings of the shafts which carry the driving gears. The top of the receptacle may be partially closed by a cover plate such as that shown at 4. This cover plate may be provided with an air inlet opening, 5, preferably at its center. The cover plate, 4, as shown in the drawings, is made funnel-shape to facilitate filling the receptacle and to deliver the entering air below the mixture outlet, 6, of the receptacle and directly into the thick of the material that has been thrown up by the agitator which is described herein. If desired an imperforate cover, such as is shown in Fig. 6, may be employed and the air inlet opening may be located in the wall of the receptacle as shown at 39. The opening, 39, may be made to admit air tangentially to the receptacle to augment the whirling motion of the mixture which motion tends to break up any lumps or globules of powder which may be thrown up by the agitator.

A perforated screen such as that shown at $5^a$ may be placed over the air intake opening and secured in any convenient preferably detachable manner, the object of this screen being to prevent the air from carrying leaves, twigs, insects and other objectionable materials into the receptacle that might interfere with the efficient working of the machine when in operation.

A fan intake-duct, 7, is provided and is connected to the outlet, 6, of the receptacle, 1. The outlet, 6, is preferably located near the top of the receptacle and so as to direct the outgoing mixture in a direction tangential to the receptacle. At one end of duct, 7, a fan housing, 8, is provided, this fan housing having an end plate with a fan inlet, 9, opening into the duct, 7. A fan shaft, 10, extends longitudinally through the duct, 7, and is mounted for rotation in suitable bearings, 11, 12. Bearing 11, is preferably supported by a bracket, 11ª, secured to an extension, 13, of the fan housing, 8, while bearing, 12, is preferably supported by plate, 2. A fan, 14, is mounted upon shaft 10, and secured to it for rotation within the housing, 8. For varying and controlling the amount of material blown out by the fan, or, in other words, for regulating the "feed" of the machine I prefer to employ a damper such as is shown at 15. The damper, 15, is adapted to vary the size of a secondary air inlet opening, 15ª, which permits air which has not passed through the supply receptacle to enter the fan intake. The opening 15ª which valve, 15, controls is preferably made in the wall of duct, 7, between the openings, 6 and 9, but may be located in any other convenient place so long as it admits air which has not passed through the receptacle to the intake of the fan. Any suitable valve or damper may be employed for controlling the admission of air through the secondary air inlet so as to give the desired dust density to the air discharged by the fan. In the drawings I have shown a damper of the sliding plate type in which, 15, is a plate which fits the outer surface of the duct, 7, and is adapted to slide thereon over the secondary air opening and to be set in any position which gives the opening required. The damper plate, 15, may be slidably mounted in grooved or slotted guides, 15ᵇ, which may frictionally engage the plate, 15, to hold it in adjusted position over the secondary air inlet opening, 15ª. Any suitable means may be provided for operating the damper plate, 15. In the drawings I have shown an outwardly projecting flange, 15ᶜ, by means of which the damper may be moved by hand.

Fan shaft, 10, and fan, 14, may be rotated by any convenient means. In the drawings this means comprises a speed-multiplying train of gears, 16, 17, 18 and 19, the first of which, gear, 16, is adapted to be rotated by means of a crank, 20, and crank handle, 21. Gear, 16, is mounted upon and secured to rotate with a shaft, 22, which has bearings, 23 and 24, in the end plates or heads, 2 and 3 respectively, of the lower portion, 1ᵇ, of receptacle, 1. Gear, 16, meshes with a pinion gear, 17, which is secured to large gear, 18. Pinion, 17, and gear, 18, are together revolubly mounted upon a fixed stud, 25, carried by plate, 2. Gear, 18, meshes with a pinion, 19, which is mounted upon and has driving connection with fan shaft, 10.

An agitator, 26, is mounted upon shaft, 22, and is secured to it for rotation by it. This agitator preferably consists of a pair of hubs, 27, 28, having radial arms, 29 and 30, the outer ends of which arms support longitudinal bars, 31, preferably in the form of twisted wire and bristle brushes of well known construction which are clearly shown in Fig. 3. In the drawings only two such bars are shown, but it will be understood that any number may be employed that will produce the desired agitation of the material. It will be observed that the bars, 31, form a revolving brush which sweeps close to the bottom of the receptacle, 1, so that it will perform its function as long as any material remains in the receptacle. It will be seen that the agitator, 26, is in the form of a U-shaped bail, or a plurality of such bails, secured to the shaft, 22, so that when the shaft is rotated, the agitator sweeps through the material close to the bottom of the receptacle and virtually progressively severs the material at the bottom and sides from its support. As the bails in their rotation rise out of the material, they throw some of it into the air above the top of the mass that is in the receptacle and it is entrained in and carried along by the air into the fan intake-duct, 7. While other forms of agitators have been proposed and I have tried a number of them, I prefer the form shown and described herein for the reason that the material in the receptacle cannot arch or bridge over the agitator or fail to fall into the space through which the agitator has passed as happens with agitators which do not either continuously move all of the material in the receptacle or do not completely momentarily sever the material from its support. Agitators which continually move all of the material in the receptacle require too much power to drive them, and those in the form of discs or radial arms which merely cut through the material do not operate satisfactorily on account of the inherent tendency of powdered or granular materials to pack and form self-sustaining walls which do not fall into the span described by the agitator so as to be acted upon the next time it passes. By providing an agitator in the form of a revoluble bail to pass progressively under practically all of the material at each revolution of the agitator shaft, a minimum of power is consumed and the material is fed at a reliably constant rate.

It will be seen that my agitator is in the form of a skeleton paddle or beater which sweeps under practically all of the material at each passage and that it will perform its function so long as there is any material left in the receptacle. The agitator should be rotated at such a speed and have such a number of bails that the desired amount of material will be thrown into the air which is passing through the receptacle. I prefer to mount the agitator bails upon the shaft to which the crank is attached as I have found that in a hand-power machine the number of revolutions per minute that a man can turn the crank in normal working effort is from thirty to forty, and with the agitators shown in the drawings, a suitable amount of material is thrown into the air at this speed.

The machine shown in the drawings is adapted to be carried by the operator by means of shoulder straps, 32, and belt, 33. A suitable body brace, 34, may be provided and it may be secured to the machine in any convenient manner, preferably by brackets such as are shown at 35.

I prefer to make the extended portion, 13, of the housing, 8, tapered or funnel-shape in form, while the body portion, 8ª, of the housing, 8, is preferably made cylindrical in form. As shown in the drawings the cylindrical portion, 8ª, of the housing, 8, extends about one half the width of the blades of fan, 14, the remaining approximate half of the width of the blades extending outward into the funnel-shape extension, 13, of housing, 8. I prefer also to provide a baffle plate or shroud, 36, at the outer end of the fan, 14, in order to obstruct the entrance of air from the discharge side of the fan into the space described by it. This plate, 36, is shown as an integral portion of the hub of fan, 14, but it will be understood that if desired it may be made separate from the hub, 14, and otherwise supported as for instance by the stationary arms, 11ª, which support the bearing, 11. The blades of the fan, 14, the walls, 8ª, and 13, of the housing and the baffle plate, 36, all tend to break up any lumps of material that are carried by the air and to thoroughly mix the air and particles of material.

It will be understood that if the fan, 14, is of the plain centrifugal type such as is shown in the drawings, as distinquished from the propeller type of fan, it will tend to discharge its output in the plane of rotation of the fan. The funnel-shape extension of the fan housing is provided to deflect and direct the output of the fan parallel to the axis of the fan in the direction it would be propelled by a propeller type of fan.

In the operation of my invention the receptacle, 1, is filled with the material to be sown broadcast up to about the level indicated by line, 37, which is short of the top of the circle described by the brushes, 31, of agitator, 26. Assuming that the receptacle is thus loaded with material to be sown broadcast and that it is strapped to the operator, the operation of the apparatus is as follows:—The operator turns the driving crank, 20, by means of handle, 21. The operator's efforts transmitted through the speed-multiplying train of gears, 16, 17, 18 and 19, rotates the fan, 14, at a high speed which causes air to enter the opening, 5, pass through the empty upper portion of receptacle, 1, through opening, 6, into duct, 7, through the space described by the fan, 14, through the housing, 8, $8^a$, and extension, 13, into the atmosphere. The rotation of crank, 20, also causes the slow rotation of shaft, 22, and with it the agitator, 26. As the agitator, 26, is rotated in the receptacle the brushes, 31, stir the material and throw it upward into the empty space at the top of the receptacle. Part of the material so raised is entrained in the stream of air which is passing through the receptacle and is carried onward through fan, 14, and discharged with the conveying or scavenging air in the form of a cloud into the atmosphere. If it is desired to reduce the density of the cloud which is discharged by fan, 14, the check damper, 15, may be opened more or less to permit previously unmixed air to enter the duct, 7, through this damper opening. The opening of this secondary air inlet immediately reduces the amount of air that is drawn through receptacle, 1, and the air which enters the secondary inlet dilutes the mixture in the stream which is passing through duct 7, into the space described by the fan, 14, so that the resultant cloud is of less density than it would be if the damper, 15, were closed.

It is obvious that by suitably proportioning the apparatus the desired normal density of the output of fan, 14, may be secured when the damper, 15, is partly open. With the apparatus so proportioned the cloud density of the output of the fan, 14, may be increased by further closing the damper, 15, or it may be diminished by further opening damper, 15, from its normal, partially open, position.

While it is possible to admit the entering air into the empty upper portion of receptacle, 1, in other than a vertically downward direction as, for instance, tangentially through such an opening as is shown at 39 in Figs. 6 and 7, I have found that a central vertical inlet, like inlet opening, 5, produces excellent results. I have also found that it is advantageous to connect duct, 7, so that the air leaves receptacle, 1, tangentially, as such an arrangement tends to give the air passing through the receptacle a whirling motion which seems to be well adapted to pick up and entrain the materials as they are thrown up by the agitator brushes, 31. The duct, 7, may however, be connected to the receptacle in other than a tangential relation.

Figure 7:
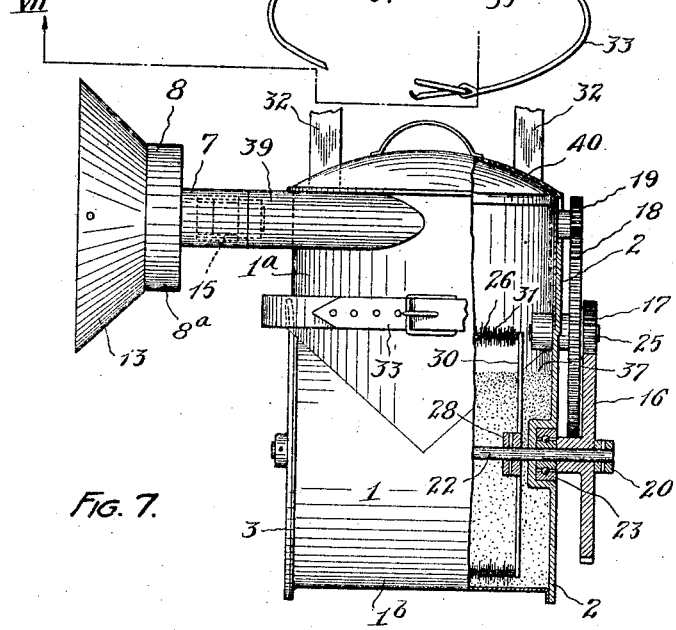
Fig. 7 is a section on line VII—VII of Fig. 6.

An imperforate cover, 40, may be employed for the receptacle shown in Figs. 6 and 7, and should be made removable for filling the receptacle.

For the receptacle shown in Figs. 1, 2, 3, and 4, a protecting cover such as that shown at 41 may be provided to prevent water from the foliage of plants which may be encountered by the apparatus from entering the powder receptacle. Openings such as shown at 42 may be provided by spaced supporting clips, 43, to permit air to enter the receptacle while the cover is in place.

The embodiment of my invention shown in the accompanying drawings and described herein is especially adapted to dusting rows of plants such as cotton or tobacco plants, berry bushes, shrubs, small trees, etc. The discharge of the cloud to the side of the operator makes it convenient for the operator to walk between the rows of plants continually operating the machine and sending out a cloud of dust over one or more rows of plants. It is obvious that the discharge end of the housing, 13, may be deflected or directed at an incline downward so as to cover a single row of plants if desired. I have found however, that for the economical use of insecticide powder, particularly in the use of calcium arsenate in the dusting of cotton plants for the eradication of the boll weevil, it is best to dust several rows at a time.

Although my invention is well adapted to be embodied in a hand-operated, man-carried machine such as that shown in the drawings I do not limit it to this application. It is obvious that, if the machine be built large and strong enough, my invention may be embodied in an animal cart or power-driven apparatus of any desired capacity.

Having thus described my invention, I claim:

1. In apparatus of the class described, a receptacle adapted to contain a supply of material to be sown broadcast, said receptacle having an air inlet adapted to direct the entire supply of entering air downwardly upon the top of the material in the receptacle, a stirrer for lifting the material up into said downwardly-directed supply of air and a mixture outlet opening from the space above the material in the receptacle, and a revoluble fan adapted to draw air through said air inlet, said receptacle and said mixture outlet, and discharge it into the atmosphere.

2. In an apparatus of the class described, a receptacle adapted to contain a supply of powdered material to be scattered broadcast, said receptacle having an air-inlet above the normal level of the material to be scattered and a mixture-outlet also opening from the space above the material and out of alinement with said air-inlet, the space between said air-inlet and mixture-outlet being substantially unobstructed, a stirrer, and means for creating a suction through said air-inlet, said receptacle above the material and said mixture-outlet to thereby discharge the entrained powdered material into the atmosphere.

3. In apparatus of the class described, a receptacle adapted to contain a supply of material to be sown broadcast, said receptacle having an air inlet and a mixture outlet, a revoluble fan having its intake connected to said mixture outlet, said fan being adapted to discharge its output into the atmosphere, and means for admitting air which has not passed through said receptacle into the intake of said fan.

4. In apparatus of the class described, a receptacle adapted to contain a supply of material to be sown broadcast, said receptacle having an air inlet and a mixture outlet, a revoluble fan adapted to draw air through said inlet, said receptacle and said mixture outlet, and discharge it into the atmosphere, and means for admitting air which has not passed through said receptacle into the space described by said fan.

5. In apparatus of the class described, a receptacle adapted to contain a supply of dry, powdered or granular material to be sown broadcast, said receptacle having an air inlet and a mixture outlet both positioned near the top of the receptacle above the top of the material therein, means for agitating said material in said receptacle so as to throw portions of it into the space above the top of the material, and means for causing air to enter said air inlet and pass out of said mixture outlet carrying with it portions of the material thrown up by said agitating means, said inlet being in the top wall of the receptacle, which top wall is dished inwardly to form a filling funnel.

6. In apparatus of the class described, a receptacle adapted to contain a supply of material to be sown broadcast, said receptacle having an air inlet and a mixture outlet, a revoluble fan, a housing for said fan provided with a fan inlet, a duct connecting said mixture outlet and said fan inlet, said duct having an opening adapted to admit air which has not passed through said receptacle.

7. In apparatus of the class described, a receptacle adapted to contain a supply of material to be sown broadcast, said receptacle having an air inlet and a mixture outlet, a revoluble fan, a housing for said fan having a fan inlet, a duct connecting said mixture outlet with said fan inlet, said duct having an opening to admit air which has not passed through said receptacle, and means for varying the size of said opening.

8. In apparatus of the class described, a receptacle adapted to contain a supply of dry material to be sown broadcast, said receptacle having an air inlet and a mixture outlet both positioned above the top of the material in the receptacle, a revoluble fan adapted to draw air through said inlet, said receptacle and said mixture outlet and discharge it into the atmosphere, and means for agitating the material in said receptacle, said means comprising a revoluble bail mounted for rotation in said receptacle, and adapted to pass through the material to progressively separate it from the bottom and sides of said receptacle and to throw portions of the material into the space above it and into the passing stream of air, said inlet being formed centrally in the top wall of the receptacle, which wall extends inwardly to bring the inlet to a level nearer to the material than the outlet.

9. In an apparatus of the class described, a powder chamber consisting of a horizontal cylinder, a mixing chamber mounted on the powder chamber and being in the form of a vertical cylinder, this mixing chamber having a tangential outlet pipe, a fan in the outlet pipe having a shaft extending through this outlet pipe and the mixing chamber, a stirrer in the cylindrical powder chamber having a shaft extending out at one end thereof, and gearing for simultaneously driving said shafts.

10. In apparatus of the class described, a revoluble fan, a housing for said fan comprising an end plate having an inlet opening at one end of said fan, a cylindrical portion surrounding said fan throughout a portion of the width of its blades and a funnel-shape, open-end extension projecting over that part of said fan not encompassed by said cylindrical portion adapted to deflect and direct the output of said fan.

11. In apparatus of the class described, a revoluble fan, a housing for said fan comprising an end plate having a fan inlet opening, a cylindrical portion surrounding a portion of the periphery of said fan and a funnel-shape, open-end extension projecting from said cylindrical portion over that portion of said fan not encompassed by said cylindrical portion adapted to deflect and direct the output of said fan, and a baffle plate between said fan and the open end of said extension.

In testimony whereof I affix my signature.

FRANK L. SESSIONS.